United States Patent
Dalias et al.

(10) Patent No.: US 6,990,124 B1
(45) Date of Patent: Jan. 24, 2006

(54) SS7-INTERNET GATEWAY ACCESS SIGNALING PROTOCOL

(75) Inventors: Robert J. Dalias, Methuen, MA (US); Lyndon Y. Ong, San Jose, CA (US); Jiri Matousek, Winchester, MA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/246,578

(22) Filed: Feb. 8, 1999

Related U.S. Application Data (60) Provisional application No. 60/079,190, filed on Mar. 24, 1998, provisional application No. 60/088,194, filed on Jun. 5, 1998.

(51) Int. Cl.
*H04J 3/12* (2006.01)

(52) U.S. Cl. .................... 370/522; 370/352

(58) Field of Classification Search ........... 370/352, 370/400, 401, 410, 522, 524, 525, 526; 379/93.01, 379/93.05, 93.06
See application file for complete search history.

(56) References Cited

U.S. PATENT DOCUMENTS

| | | | |
|---|---|---|---|
| 5,084,816 A * | 1/1992 | Boese et al. ............... 370/225 |
| 5,717,745 A * | 2/1998 | Vijay et al. ............. 379/112.05 |
| 5,870,565 A * | 2/1999 | Glitho ......................... 709/249 |
| 6,064,653 A * | 5/2000 | Farris ......................... 370/237 |
| 6,070,192 A * | 5/2000 | Holt et al. ................... 709/227 |
| 6,078,582 A * | 6/2000 | Curry et al. ................. 370/352 |
| 6,084,956 A * | 7/2000 | Turner et al. ............... 379/230 |
| 6,134,235 A * | 10/2000 | Goldman et al. ........... 370/352 |
| 6,292,478 B1 * | 9/2001 | Farris ......................... 370/352 |
| 6,292,479 B1 * | 9/2001 | Bartholomew et al. ..... 370/352 |

OTHER PUBLICATIONS

Dr. Amir Atai and Dr. James Gordon, "Architectural Solutions to Internet Congestion Based on SS7 and Intelligent Network Capabilities," A Bellcore White Paper, 1997, 18 pages.

* cited by examiner

*Primary Examiner*—Bob A. Phunkulh
(74) *Attorney, Agent, or Firm*—Blakely Sokoloff Taylor & Zafman, LLP (57) ABSTRACT

A improved protocol for communication between a SS7 gateway and a Remote Access Server (RAS). The gateway connects to the SS7 network and supports, e.g., ISUP and TUP protocols. The gateway relays call handling and administrative events over an Internet Protocol (IP) connection to the RAS using the protocol.

17 Claims, 3 Drawing Sheets

SS7-INTERNET GATEWAY ACCESS SIGNALING PROTOCOL

RELATED APPLICATIONS

This non-provisional patent application claims the benefit of U.S. Provisional Application No. 60/079,190, filed Mar. 24, 1998, entitled, "SS7-INTERNET GATEWAY ARCHITECTURE AND ACCESS SIGNALING PROTOCOL" and U.S. Provisional Application No. 60/088,194, filed Jun. 5, 1998, also entitled, "SS7-INTERNET GATEWAY ARCHITECTURE AND ACCESS SIGNALING PROTOCOL".

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to data communications. In particular, the present invention is related to a gateway architecture for supporting interworking of a Public Switched Telephone Network (PSTN) Signaling System 7(SS7)-based out-of-band signaling network with a data network such as the Internet or an intranet.

2. Description of the Related Art

Out-of-Band Signaling

Signaling in a telecommunications network involves transmission of information between network elements to provide telecommunications service. Signaling between network elements in a Public Switched Telephone Network (PSTN) includes, for example, transmission of dialed digits, dial tone, call-waiting tone, busy signal, etc.

Figure 1:
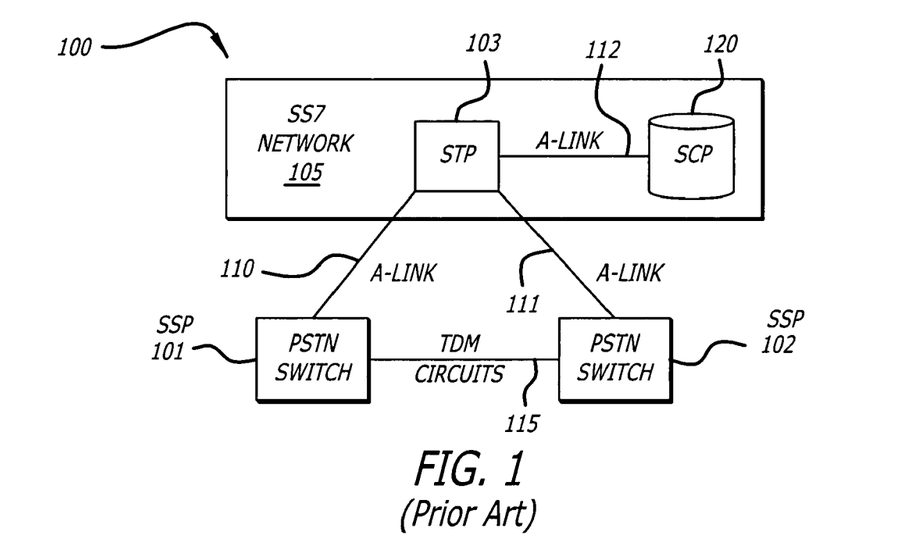
FIG. 1 illustrates a diagram of prior art SS7 architecture for a PSTN.

As illustrated in FIG. 1, out-of-band signaling is signaling that occurs over a separate signaling link (e.g., link 110 and link 111) rather than the trunk (e.g., time division multiplexed (TDM) lines 115) over which transmission of user information, e.g., in the form of voice or data transmissions, occur. In a PSTN, when a call is placed, the dialed digits and other information necessary to establish the call are transmitted out-of-band over a signaling link rather than the trunk circuit 115 over which the actual call is conducted. There are several advantages to transmitting signaling out-of-band, including higher voice or data throughput on the trunk circuit, the ability to transmit signaling information at any time, not just the beginning and end of a call, and the ability to send signaling to network elements regardless of whether there is an associated trunk connection.

Out-of-Band Signaling Using SS7

With reference to FIG. 1, Signaling System 7 (SS7) is a standard defined by the International Telecommunications Union (ITU) Telecommunications Standardization Sector (ITU-T). The standard defines the procedures and protocol that supports out-of-band signaling between telecommunications network elements to effect call set up (either wireline or wireless communications), routing and control, using a Common Channel Signaling (CCS) network. Variations under the standard are promulgated by the American National Standards Institute (ANSI), Bellcore, and the European Telecommunications Standards Institute (ETSI). A PSTN transmits signaling information, e.g., call setup, etc., over dedicated out-of-band signaling links, typically 56 or 64 kilobits per second (kpbs) bidirectional links), rather than transmitting the control information in-band over voice channels.

An SS7 signaling network 105, that is, an out-of-band signaling network that operates in accordance with the SS7 procedures and protocol, has three fundamental components. The components are signaling, or service, switching points(SSPs), signal transfer points (STPs), and signal, or service, control points (SCPs). SSPs are PSTN switches, also referred to as Central Office (CO) switches, such as PSTN switches 101 and 102, that are controlled by SS7 software to originate, terminate and switch calls via the SS7 out-of-band signaling network, hereinafter referred to as the SS7 signaling network or SS7 network. STPs, such as STP 103 within the SS7 network 105, route signaling information throughout the SS7 network to the appropriate destination network element. Service Control Points (SCPs) such as SCP 120 are essentially databases accessed in the SS7 network to, for example, provide information for call processing.

Signaling points are uniquely identified in the SS7 network by numeric point codes that are included in the signaling messages transmitted between signaling points to uniquely identify the source and destination signaling points for the messages. Routing tables associate a point code with a path through the SS7 network so that a source signaling point can transmit a message to a destination signaling point in the SS7 network. An STP is a packet switch that routes incoming messages it receives to a signaling link according to routing information contained in the SS7 messages.

SS7 Signaling Links

Again with reference to FIG. 1, SS7 signaling links is are characterized differently according to their use. The SS7 protocol defines A, B, C, D, E and F links. A links 110, 111 and 112("access links") interconnect STP 103 to either an SSP (PSTNs 101 or 102) or an SCP, e.g., SCP 120. A links transfer signaling information to or from end signaling points in an SS7 network. C links ("cross links") interconnect a mated pair of STPs for reliability. B and D links ("bridge and diagonal links") interconnect two mated pairs of STPs to transmit signaling information between STPs in the SS7 network. A call placed between SSPs 101 and 102 involves transmitting call setup information between SSPs 101 and 102 via SS7 network 105, specfically, via A link 110, STP 103 and A link 111. Once the call is established, voice, data, etc., is transmitted in a time division multiplexed manner over communications medium 115, i.e., trunk circuit 115. Upon completion of the transfer of user information between SSP 101 and 102, call tear down information is transmitted out-of-band over the SS7 signaling network in the same manner as the call set up information.

SS7 Protocol Layers

SS7 is a layered protocol that provides for the exchange of signaling information in support of, and to maintain, a telecommunications network. A physical layer referred to as Message Transfer Part (MTP) Level 1 defines the electrical characteristics of the signaling links of the SS7 network. The signaling links typically utilize digital channels (DS0s) capable of transmitting a digital signal at 56,000 to 64,000 bits per second, or even T1 or E1 links.

A series of higher layer protocols known as the Message Transfer Part (MTP) Levels 2 and 3, collectively referred to as the Message Transfer Part, are essentially equivalent to layers 2 and 3 of the International Standards Organization (ISO) Open Systems Interconnection (OSI) 7 layer conceptual model. Thus, MTP Level 2 provides link layer functionality, such as error checking, flow control, etc., and MTP Level 3 provides network layer functionality, such as routing and congestion control. The MTP Levels 1, 2 and 3 provide a service to the upper layer SS7 protocols, namely, ISUP, TCAP, SCCP, and OMAP protocols, briefly described below.

Integrated Services Digital Network (ISDN) User Part (ISUP) controls the messages for the set-up and tear down of trunk circuits that carry voice or data between and originating, or source, and terminating, or destination, PSTN Central Offices (CO), which are SSPs in the SS7 network.

Signaling Connection Control Part (SCCP) provides end to end routing of TCAP messages and global title translation. A second function of SCCP is global title translation, which provides incremental routing to free source signaling points from maintaining routing information otherwise necessary to reach every destination signaling point in the SS7 network. The source signaling point can query a STP for routing information and request global title translation. The STP decodes the request and routes messages accordingly on behalf of the source signaling point. Global title translation is utilized, for example, in translating a logical address, such as an 800 number dialed by a user, to an actual address of the corresponding 800 number translation application in the signaling network, i.e., the point code of the SCP and the subsystem number for the 800 number translation application.

Transaction Capabilities Application Part (TCAP) supports the exchange of non-trunk circuit related information between signaling points using a SCCP connectionless service, such as 800 service messages and calling card verification. Finally, Operations, Maintenance, and Administration Part (OMAP) supports the additional signaling network management functions such as testing the STP routing tables for loops within the signaling network.

Integration of Telecom and Datacom Networks

In summary, SS7 based telecommunications networks are in operation throughout the world linking the telecommunications switching infrastructure to support many functions, including basic call control, for which the SS7 based networks provide essential functions, and call supplementary services such as number translation and calling card validation. However, presently, data communication networks lack access to the SS7 network, and, as a result, do not benefit from the infrastructure which might otherwise provide for integrating voice and data services, and increasing data communications bandwidth for user data by moving overhead, control, and signaling traffic to the out-of-band signaling network.

What is needed, therefore, is a gateway to the SS7 network providing for the integration of telecommunications networks and a data network, such as the Internet or an intranet, that will allow users to operate in an environment providing for both voice and data services. By accessing the telecommunications network using SS7, data network elements in the Internet or intranet fit cleanly into the telecommunications network infrastructure as peer SSPs and SCPs and can exchange signaling information with telecommunications network elements for routing and treatment of connections.

BRIEF SUMMARY OF THE INVENTION

A gateway architecture for interworking of a PSTN SS7 signaling network with a data network, such as the Internet or an intranet, is described. A Signaling System 7 (SS7) network is the primary means used in the PSTN for control of circuit-switched connections and value added PSTN services. PSTN/SS7-to-Internet interworking provides integration of PSTN and Internet services such as remote intranet or Internet access and Internet Protocol (IP) telephony.

There are several applications for the SS7 network in association with a Network, or Remote, Access Server (RAS). The most common application is call control for both originating and terminating calls. A second application is the execution of user applications between the RAS and a service control point (SCP), or another service switching point (SSP) or network node with a point code. The gateway provides a common interface for control between the telecommunications network and the Internet or an intranet, and improvements to the gateway to RAS access protocol.

BRIEF SUMMARY OF THE SEVERAL VIEWS OF THE DRAWINGS

The present invention is illustrated by way of example and not limitation in the following figures, in which.

DETAILED DESCRIPTION OF THE INVENTION

Overview

An embodiment of the present invention provides the architecture for an SS7 to data network (e.g., Internet or intranet) gateway, allowing for out-of-band signaling between a PSTN switch and a network address server, herein referred to as the Remote Access Server that front ends the data network. The present invention addresses the gateway architecture and functions, and the protocol used between the gateway and the RAS. Protocol functions include connection setup between the gateway and the RAS (which operates as a service switching point (SSP) in the SS7 network), registration and status information exchange for the RAS, and management functions for the channels between the gateway and RAS. Since call control and other overhead or control signaling between a CO/SSP and the RAS is accomplished over the SS7 signaling network, via the gateway, T1 circuits may be utilized instead of primary rate ISDN (PRI) lines to transmit voice or data, lowering user's access costs to the data network. Additionally, accessing databases over the SS7 network relating to such applications as billing, network monitoring, real time queries, etc., is possible.

In the following description, numerous specific details are set forth in order to provide a thorough understanding of the present invention. It will be apparent, however, to one of ordinary skill in the art that the present invention may be practiced without these specific details. In other instances, well-known architectures, circuits, and techniques have not been shown to avoid unnecessarily obscuring the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium.

SS7 interconnection to a data network (e.g., Internet or intranet) access point, such as a Remote Access Server (RAS), appears to the telecommunications network as a peer telecommunications service switching point (SSP), for purposes of terminating calls for Internet access. Further applications include allowing exchange of information between more general nodes within the PSTN and Internet, such as a PSTN SCP and an Internet telephony service, or a PSTN switch and an Internet information server, such as a directory.

An embodiment of the present invention provides an open, standards based interface between the Remote Access Server (RAS) and the gateway connecting the RAS to the SS7 network. For example, in one embodiment of the invention, a simple but extensible protocol, based on ITU-T Recommendation Q.931 (1993), and ISDN user-network interface layer 3 specification for basic control, provides for communication between the gateway and RAS.

Overview of Applications

Call Control

Figure 2:
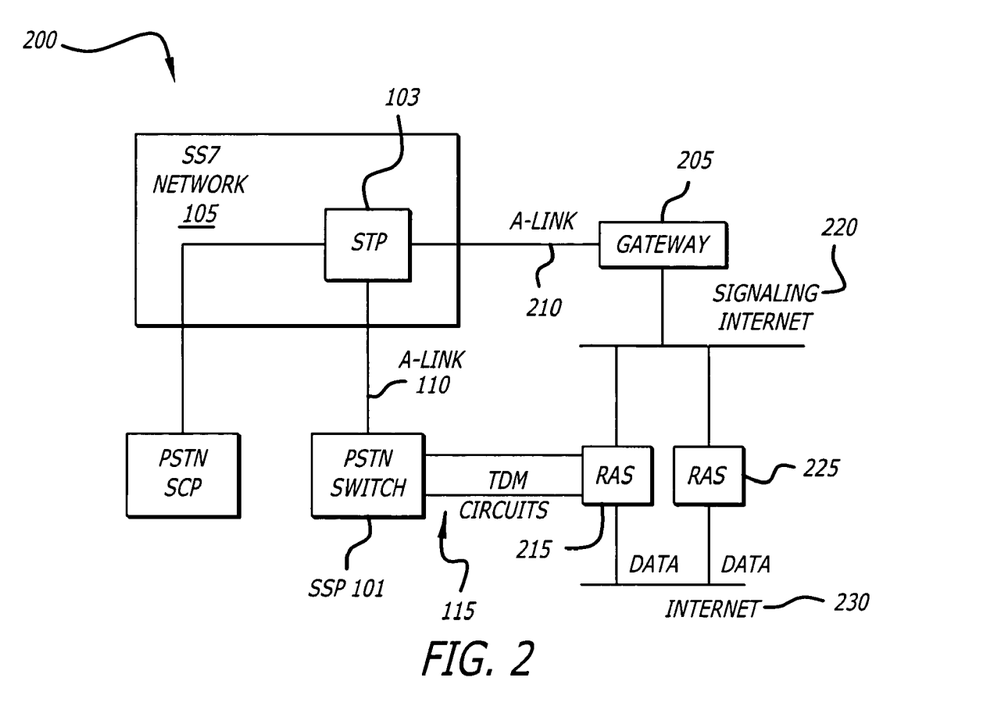
FIG. 2 is a block diagram an embodiment of the present invention as may be utilized for call set-up.

Because the SS7 signaling is done out of band on a separate common channel signaling network, such as an SS7 signaling network, the user can obtain 64 kilobits per second, time division multiplexed (TDM) circuits between the PSTN switch (which operates as an SSP in the SS7 network) and the RAS, without incurring the cost of primary rate ISDN. The SS7 signaling (call control) is done between the STP and the RAS (which also operates as an SSP in the SS7 network). All call control messages are sent over the SS7 network and the payload, i.e., user voice or data messages, is sent on the TDM circuits between the PSTN switch and the RAS. With reference to FIG. 2, a simplified block diagram illustrates the relationship of the STP, PSTN switch, and the RAS. The diagram shows a dedicated "signaling internet" used between the RAS and gateway to ensure physical separation of signaling traffic and user data traffic. However, it is appreciated by those of ordinary skill in the art that other arrangements are possible.

Data Base Applications

The SS7 procedures and protocol allow for end-to-end routing of messages across the PSTN, via STPs, for message routing using SS7 Message Transfer Part (MTP), Signaling Connection Control Part (SCCP) and Transaction Capabilities Part (TCAP) layered protocols. The end-to-end routing of messages provides support for PSTN database applications such as 800 or freephone number translation, calling card validation, and calling name identification.

It is appreciated that end-to-end routing of messages across the SS7 network may be utilized for data communications as well, as the SS7 network provides a reliable transport network for highly sensitive traffic, and a supporting environment for equivalent database applications for data communications, such as billing applications, maintenance and configuration processes, etc.

Another database application in SS7 is trunk group selection to the RAS. Different standards have developed for modem termination that require connections to be terminated on a RAS equipped for a specific modem standard, depending on the caller's modem. Selection of the trunk group corresponding to a particular modem type could be enabled by triggering a query from the telecommunications switch to the gateway (which may pass this on to another node) to ask for trunk group selection based on, e.g., called number, calling number, or some other classmark.

Voice over Internet Protocol (VOIP)

VoIP call termination and origination through the public switched telephone network, with direct control over message delivery, reduces the cost of delivering toll by-pass services. It is appreciated that VoIP may require additional features in the future to make it comparable with standard telephony service, including features that are currently implemented using the SS7 network. Remote Access Servers containing both SS7 and VoIP functionality give Internet Service Providers the ability to launch new voice offerings.

Internet Service Providers (ISPs) need to integrate SS7 and IP control capabilities to provide transparent service to users on PSTN and VoIP networks. Projections that some significant fraction of voice traffic will utilize IP networks in the future suggest that the ability for PSTN users and VoIP users to locate and talk to each other and access similar services will be essential in the future. Transparent routing and services can be enabled by connecting PSTN/SS7 signaling networks with directory and service information in TCP/IP data networks to support number translation, routing and calling card services for calls transiting from PSTN to IP and vice versa.

Network Architecture

With reference to FIG. 2, a block diagram of an embodiment of the present invention (200) is provided. Users access data network 230 via Remote Access Servers 215 and 225 by dialing in to either RAS. A call is placed through their local Central Office (CO), i.e., PSTN/SSP 101 to access RAS 215 over TDM trunk circuits 115. However, rather than utilizing a channel in the TDM trunk circuits 115 as a control channel to transmit control information, e.g., call setup information, the control information is transmitted out-of-band, over SS7 signaling network 105, via A-link 110, STP 103 and A-link 210. (It should be noted that the network architecture depicted in FIG. 2 is, of course, a simplified example, provided for purposes of illustration of an embodiment of the present invention. It is appreciated that the present invention is applicable over sophisticated, complex PSTN/SS7 network architectures as well.)

Gateway 205 provides an interface between the SS7 protocols utilized to communicate control information over the SS7 network, and the protocols utilized to communicate the control information to a remote access server, e.g., RAS 215. As described in more detail below, the gateway operates as an SSP in communicating with STP 103 via A link 210 according to the SS7 layered protocols. Furthermore, the gateway communicates with a RAS via data network 220 according to a second set of layered protocols. In one embodiment, Gateway 205 communicates with, e.g., RAS 215 in accordance with a variant of ITU-T Recommendation Q.931 (1993), ISDN user-network interface layer 3 specification for basic control. In this manner, the gateway 205 exchanges control information with PSTN/SSP 101 via the SS7 signaling network. Upon completion of call setup, the payload, e.g., user voice or data, is transmitted over a channel of TDM circuits 115 between the CO and the appropriate RAS, which in turn, exchanges the user voice or data over data network 230 with the ultimate destination for the payload, e.g., a workstation or server on the data network.

The diagram shows a dedicated "signaling internet" 220 providing for communication between RAS 215 and 225, and gateway 205 to ensure physical separation of signaling traffic and user data traffic. However, it is appreciated by those of ordinary skill in the art that other arrangements are within the scope of the present invention. For example, the signaling, or control traffic, and the user voice or data traffic may share the same data network, e.g., data network 220. Furthermore, the Figure illustrates a second RAS 225 connected to TDM circuits 115 for receiving and transmitting user data and voice between the same PSTN switch 101. However, the RAS may receive/transmit user voice and/or data with another PSTN switch, not shown. The Figure further illustrates RAS 215 and 225 sharing a common signaling internet (data network 220), but may well be connected to separate gateways via separate signaling links. Additionally, although RAS 215 and 225 provide access to the same user data network 230 in FIG. 2, it is appreciated that the remote access servers may provide user access to separate user data networks. Finally, gateway 205 is illustrated as a device physically separate from and communicating with either RAS 215 or 225, via an external signaling network. However, it is appreciated that the gateway functionality and RAS functionality may be housed within the same physical unit, wherein the signaling network, if separate from the user data network, is an internal communications path or bus providing for communication of signaling information between the gateway functions and RAS functions.

Since the gateway and RAS are connected via Internet protocols, there is a great deal of flexibility in locating and matching the gateway and RAS. For example, the gateway and RAS can be co-located close to the telecommunications switch, acting as a single logical peer switch, as illustrated in the block diagram of an embodiment of FIG. 4, in which RAS 215 and 225 are connected via dedicated links 405 and 410, respectively, to gateway 205. Alternatively, the gateway can provide a central interface point for many remote access servers scattered in multiple locations, operating essentially as a concentrator, or Signal Transfer Point (STP) in the SS7 signaling network, as illustrated in the block diagram of embodiment 500 in FIG. 5, in which RAS 215 and 225 are commonly connected to gateway 205 via internet 220, but separately connected to different SSPs 501 and 101, via TDM circuits 515 and 115, respectively.

Gateway Architecture

The SS7-Internet gateway architecture takes into account a number of factors:

SS7 links are designed to carry signaling for large telecommunications switches, which handle many more terminations than a single remote access server. For example, a single 56 kilobits per second SS7 signaling link can support 50,000 busy hour call attempts.

The SS7 network addressing scheme is also designed to handle a limited set of signaling points. The International Telecommunications Union (ITU) version of SS7 utilizes a 14 bit address field to identify all signaling points belonging to the international network, while the U.S. national version uses a 24 bit address field to identify signaling points belonging to North American networks.

SS7 protocol layers come in a number of versions, including ITU and various national versions. It is appreciated that an SS7-Internet gateway supports these different versions as well.

Figure 4:
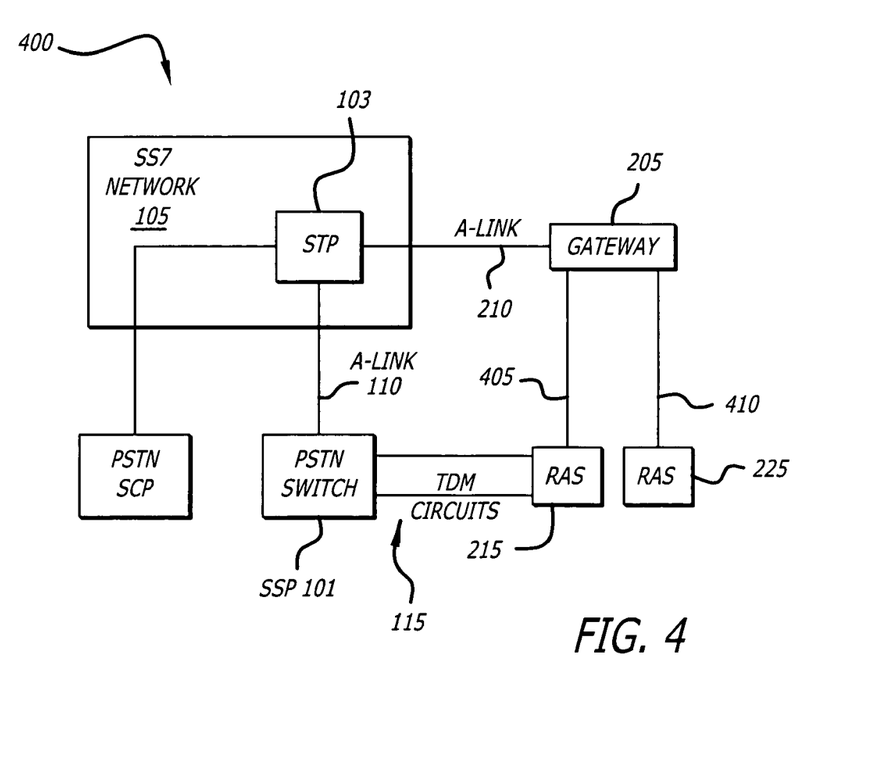
FIG. 4 is a block diagram of another embodiment of the present invention.
Figure 5:
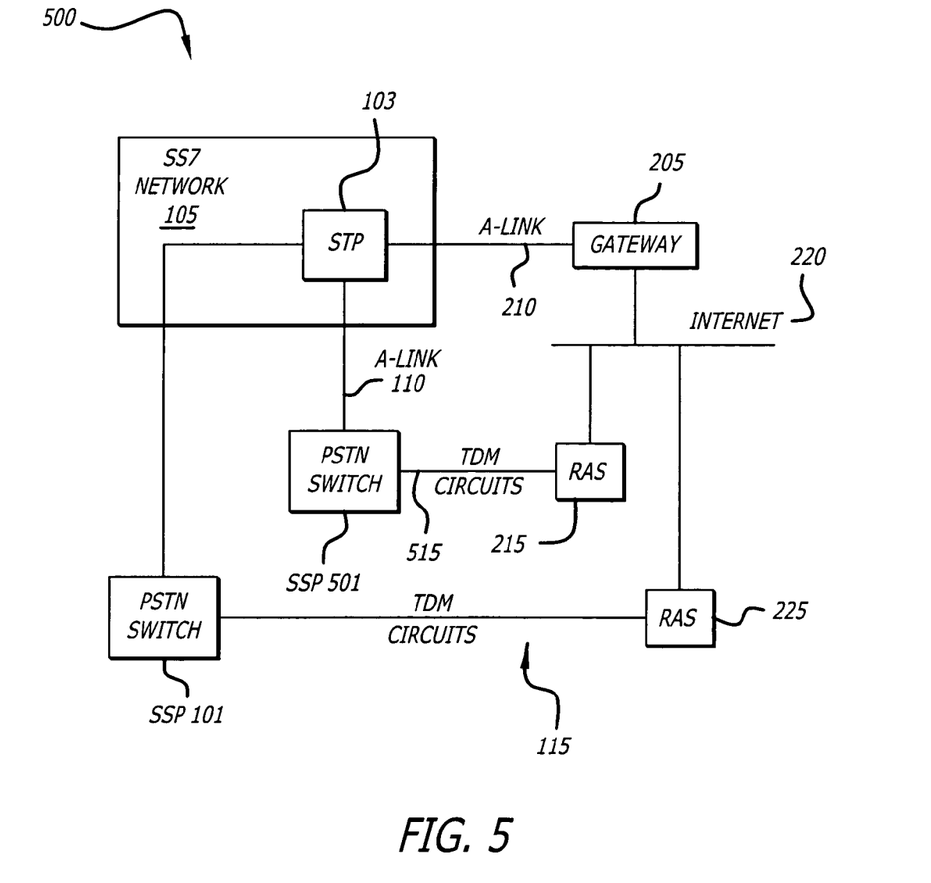
FIG. 5 is a block diagram of yet another embodiment of the present invention.

Taking these factors into account, the gateway is designed to be a separate entity providing gateway service to a community of one or more remote access servers, as illustrated in FIGS. 2, 4, and 5. This allows consistency with the scaling assumptions for SS7 signaling links and addressing, and also allows the SS7 protocol handling function to be modularized, so that the gateway supports different SS7 versions without affecting the configuration of the remote access servers.

Modularizing the gateway also opens the configuration of gateways and remote access servers, allowing multiple gateway and RAS vendors to provide products that interoperate based on a common gateway-to-RAS protocol.

The gateway also serves as a point of security, providing functions such as access to RADIUS servers for authentication, screening on calling party number, and automatic callback. The gateway provides open application programmatic interfaces (APIs) for service development leveraging of its basic call processing functions. The addition of gateway functions adds to the ability of Internet Service Providers to support a variety of service level offerings to customers.

Gateway Functions

Figure 3:
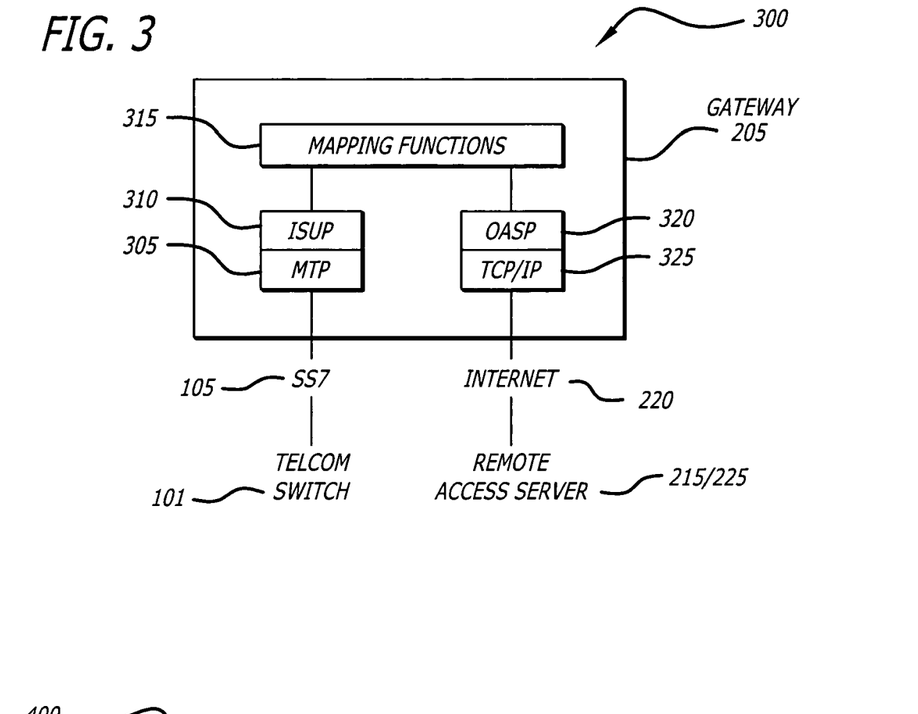
FIG. 3 is a protocol stack diagram of an embodiment of the present invention.

With reference to FIG. 3, the gateway, e.g., gateway 205 supports the following functions:

termination of SS7 protocols on the SS7 side, including Message Transfer Part (MTP) 305, ISDN User Part (ISUP) 310, Signaling Connection Control Part (SCCP) (not shown), and Transaction Capabilities (TCAP) (not shown) for database access traffic. Telephony User Part (TUP) may also be supported for some networks. This includes MTP network management functions as required for any SS7 signaling point.

termination of IP and Local Area Network (LAN) protocols on the Internet or intranet side, including Transport Control Protocol/Internet Protocol (TCP/IP) 325, IEEE 802.3/Ethernet and other LAN protocols (not shown).

for connection control, termination of the gateway-RAS protocol, herein referred to as the Open Access Signaling Protocol (OASP) 320. This maps between SS7 ISUP messages and connection setup to the RAS.

mapping functions 315 providing for mapping of the Point Code and Circuit Identification Code (CIC) on the SS7 side to an IP address and Channel ID associated with the corresponding RAS device on the Internet side. This mapping is created during configuration of the gateway, and, in one embodiment, is a static mapping. More generic mapping of SS7 Point Codes and Subsystem Numbers to IP address and application information is necessary for database access features.

support for gateway redundancy and security features, to ensure that the gateway reliability and security is consistent with signaling requirements.

Additionally, state information is maintained at the gateway to support network management features, including state information for the attached RAS devices and some state information pertaining to the circuits connecting the telecommunications switch and RAS.

Gateway Protocol

A new protocol, referred to herein as the Open Access Signaling Protocol (OASP) 320, provides the signaling interface between the SS7 gateway 205 and a Remote Access Server (RAS). The functions of the protocol include call setup from the telecommunications PSTN switch, e.g., SSP 101, to a RAS, e.g., RAS 215, registration and status management of the RAS-gateway relationship, and management of the circuits.

Call Setup

The protocol supports basic call setup and release and provides similar functions and information to the SS7 ISUP call setup and release messages (especially IAM, ANM, REL and RLC—refer to the SS7 documentation for details on the messages.). The messages and parameters are a subset of the full ISUP protocol, since ISUP standards take into account many situations that are not needed for remote access services.

The gateway provides a mapping from a specific Circuit Identification Code (CIC) used in SS7 to identify that termination at the telecommunications switch as the equivalent interface and channel at the RAS.

Registration and Status

The protocol supports management of the relationship between a RAS and the gateway, providing functions such as notification when the RAS is ready to receive or generate traffic, and status of the circuits interfacing to the RAS.

Management

The gateway protocol supports circuit network management functions such as the ability to declare circuits out of service in case of failure, and the ability to block circuits. Blocking in SS7 terminology prevents future call attempts by one side or the other for the circuit, and results in graceful shutdown of the circuit to allow maintenance actions to take place. During graceful shutdown of a T1 circuit, for example, all DS0 channels gradually revert to the idle state as existing calls are released. When all channels are idle, the T1 can be removed from service.

Advantages

Scaling

As discussed above, SS7 was designed for signaling between large telecommunications switching systems, concentrating signaling for many lines onto a common signaling channel. The gateway 205 allows a single gateway to support interconnection scaling up to large numbers of remote access servers, as needed to support data network access, e.g., Internet access for a particular provider.

Redundancy

Due to the mission critical nature of the gateway, it should support some form of redundancy in all configurations.

There are 2 Options for Providing Redundancy:

Highly available—This option includes one gateway with a hot standby gateway, multiple interfaces, and the appropriate software to control the switchover in time of failure. Calls may be lost during service interruptions but the loss is minimal.

Fault tolerant—This option provides a much higher level of sophistication. This option can be a single or multiple gateway configuration with the appropriate software. However, no calls are to be lost during gateway switchover and the availability is much higher than the "Highly Available" option.

Open Access Signaling Protocol (OASP)

As stated above, the SS7 gateway integrates Remote Access Servers (RASs) into the voice networks. This gateway connects into the SS7 network and implements the ISUP and/or TUP protocol. It relays call handling and administrative events over an IP connection to one or multiple RASs. The connection between the gateway and the Remote Access Servers is implemented using IP. It is assumed that a reliable message delivery mechanism is used.

The gateway is a signaling point in the SS7 network and terminates ISUP (TUP) messages. It supports multiple A-link connectivity to possibly multiple STPs. It is capable of maintaining the state of each call (as seen by the SS7 network), of the T1/E1 trunks and of all channels for each RAS.

For redundancy purposes, each RAS is connected to potentially two gateways, which operate in a hot standby arrangement.

In one embodiment, all the bearer channels are connected to the same switch (code point). However, in alternative embodiments, the channels may be connected to separate switches.

The gateway to RAS protocol is based on the ITU-T Recommendation Q.931 (1993), ISDN user-network interface layer 3 specification for basic control allowing for inter-operability between different gateways and different Remote Access Servers, with some extensions as needed for this particular environment.

The gateway hides any differences between the different variances of the SS7 protocol and present the same protocol on the LAN side.

The OASP protocol allows the implementation of several maintenance procedures at the SS7 gateway. Namely, it allows:

busying of trunks and channels;

shutdown of trunks both gracefully and abruptly;

the execution of circuit continuity check initiated by the far-end switch, either during call establishment or operator initiated; and the execution of circuit continuity check initiated by the SS7 gateway operator.

Mapping of Circuit Identification Codes (CICs)

The RAS is configured to identify each interface by a number, typically number in the range 1–n (where n is the number of interfaces it supports). When the RAS registers its interfaces, the gateway's configuration tables allow it to translate the interface number specified in the message specified in this document into Circuit Identification Codes (CICs) which the SS7 network requires.

Security

Both incoming and outgoing calls (from the RAS perspective) are supported by the protocol. However, configuration options in the gateway and in the RAS are provided, which will allow the system administrator to inhibit the placement of outgoing calls (from the RAS into the PSTN network).

In order to insure the integrity of the signaling messages sent between the gateway and the RAS, the gateway and the RAS can be configured with a shared secret. This secret, together with the IP data is passed through one way hash function (MD5) and the result appended to the message. The recipient of the message recalculates the hash and accepts the message only if the results compare.

Redundancy (Backup Gateways)

If redundant gateways are to be used, it is assumed that the gateways are mirroring their states in a hot standby arrangement. The scenario described below also works, if a single fault tolerant gateway with a backup Ethernet is used.

The RAS's configuration defines IP addresses of primary and of backup gateways. The RAS attempts to connect to the primary gateway; if that fails it attempts to connect to the backup gateway. It repeats this process until a connection is established. It then registers with the gateway, using messages defined below.

If the IP connection is broken (e.g., because the primary gateway failed), it repeats the above described algorithm, until a connection is made to a gateway. The backup gateway is then able to recover its state using its data structures and the information provided by the RAS.

Layer 3 Protocol Messages

With reference to the Q.931 specification, the SS7 Gateway implements the network side and the RAS implements the user side of the Q.931 protocol. The following maintenance messages are extensions to the standard Q.931 message set. They are sent with a different protocol discriminator. They are used by the RAS to register its capability, its interfaces and the state of each channel after an IP connection between the RAS and the gateway is established. They are also used by the RAS to report on state changes to an interface or a channel, or by the gateway to request a state change of an interface or a channel.

RAS STATUS
    RAS STATUS ACK
    INTERFACE STATUS
    INTERFACE STATUS ACK
    RESOURCE UPDATE
    RESOURCE UPDATE ACK
    SERVICE
    SERVICE ACK
    CONTINUITY CHECK RESULT
    CONTINUITY CHECK RESULT ACK Further information on each of these maintenance messages is described below:

RAS STATUS

| Information element | Direction | Length |
| --- | --- | --- |
| Protocol discriminator | RAS -> GW | 1 |
| Call reference | RAS -> GW | 3 |
| Message type | RAS -> GW | 1 |
| RAS Status Info | RAS -> GW | 3 |
| RAS Capabilities | RAS -> GW | 3–6 |

This message is sent by the RAS to register the fact that it is operational. It also specifies its capabilities (this aspect is provided for future expansion).

RAS STATUS ACK

| Information element | Direction | Length |
| --- | --- | --- |
| Protocol discriminator | GW -> RAS | 1 |
| Call reference | GW -> RAS | 3 |
| Message type | GW -> RAS | 1 |
| Cause | GW -> RAS | |

This message is sent by the gateway to RAS in response to RAS STATUS to indicate whether the gateway allows the RAS to receive and generate calls. The Cause Information Element indicates the success/failure of the requested operation.

INTERFACE STATUS

| Information element | Direction | Length |
| --- | --- | --- |
| Protocol discriminator | RAS -> GW | 1 |
| Call reference | RAS -> GW | 3 |
| Message type | RAS -> GW | 1 |
| Interface Status Info | RAS -> GW | |

This message is sent by the RAS to the gateway to register the available interfaces and the status of each channel on that interface. Once this information is sent by the RAS to the gateway, any changes in the state of any interface or any channel is reported to the gateway using the SERVICE message. Also any call tear-down originated by RAS is reported to the gateway.

The gateway process and responds to the INTERFACE STATUS message before requesting any interface or channel state changes using the SERVICE message. Once it responds to the INTERFACE STATUS message, the gateway also starts originating and terminating calls.

INTERFACE STATUS ACK

| Information element | Direction | Length |
| --- | --- | --- |
| Protocol discriminator | GW -> RAS | 1 |
| Call reference | GW -> RAS | 3 |
| Message type | GW -> RAS | 1 |
| Cause | GW -> RAS | |

This message is sent by the Gateway in response to INTERFACE STATUS message. The Cause Information Element indicates the success/failure of the interface registration operation.

RESOURCE UPDATE

This message is sent by the NAS to register the resources it controls. The NAS will also send this message whenever the number of resources has changed as a result of failure or administrator action (e.g. modem failure). The message will be sent using non-global Call Reference.

| Information element | Direction | Length |
|---|---|---|
| Protocol discriminator | RAS -> GW | 1 |
| Call reference | RAS -> GW | 3 |
| Message type | RAS -> GW | 1 |
| Shift to Codeset | RAS -> GW | 1 |
| RAS resource 1 (see note 1) . . . RAS resource n | RAS -> GW | |

(1) This information element can be repeated 1 to n times.

RESOURCE UPDATE ACK

| Information element | Direction | Length |
|---|---|---|
| Protocol discriminator | GW -> RAS | 1 |
| Call reference | GW -> RAS | 3 |
| Message type | GW -> RAS | 1 |
| Cause | GW -> RAS | 2–32 |

This message is sent by the gateway to NAS in response to RESOURCE UPDATE. This message will be sent using non-global Call Reference.

SERVICE

| Information element | Direction | Length |
|---|---|---|
| Protocol discriminator | Both | 1 |
| Call reference | Both | 3 |
| Message type | Both | 1 |
| Change Status | Both | 3 |
| Channel Identification | Both | 3–6 |

The gateway sends this message to request the change of the current status of an interface or channel. The RAS sends this message to report to the gateway the change in status of a particular interface or a channel.

SERVICE ACK

| Information element | Direction | Length |
|---|---|---|
| Protocol discriminator | Both | 1 |
| Call reference | Both | 3 |
| Message type | Both | 1 |
| Change Status | Both | 3 |
| Channel Identification | Both | 3–6 |

This message is sent as an acknowledgment to the SERVICE message. If sent be the RAS, it indicates that the RAS is processing the SERVICE request. If sent by the gateway, it indicates that the gateway has recorded the change in status.

CONTINUITY CHECK RESULT

| Information element | Direction | Length |
|---|---|---|
| Protocol discriminator | RAS -> G/W | 1 |
| Call reference | RAS -> G/W | 3 |
| Message type | RAS -> G/W | 1 |
| Continuity Result | RAS -> G/W | |
| Channel Identification | RAS -> G/W | 3–6 |

The RAS sends this message to report to the gateway the result of continuity check for a particular channel.

CONTINUITY CHECK RESULT ACK

| Information element | Direction | Length |
|---|---|---|
| Protocol discriminator | G/W -> RAS | 1 |
| Call reference | G/W -> RAS | 3 |
| Message type | G/W -> RAS | 1 |

This message is sent by gateway to RAS as an acknowledgment to the CONTINUITY CHECK RESULT message.

Examples of Timing Diagrams

RAS Registers with Gateway for Service.

The following timing diagram shows that the RAS is responsible for the registration of the interfaces under its control.

Handling of Incoming Call

The following diagram shows successful Call establishment sequence for gateway originated calls.

Unsuccessful Call Establishment Sequence

The following sequence illustrates when a call is rejected by the RAS.

Continuity Test as Part of Call Setup

The following sequence illustrates when the gateway receives IAM message indicating that a continuity test should be performed on the circuit prior to the call establishment.

Continuity Test Initiated by SS7 Gateway Operator

The gateway sends SERVICE message to initiate the continuity check. The RAS performs continuity check and report the result using CONTINUITY CHECK RESULT.

RAS Detects Bearer T1/E1 Line Down (LOS, Red Alarm)

If the RAS detects that a particular T1/E1 line failed, it sends SERVICE message to the gateway. Established calls are torn down as part of normal processing—i.e the RAS modems detect loss of connection and the RAS disconnects the call. The gateway requests is blocking of CICs associated with the particular T1/E1.

Individual Bearer Channel Busy-out Initiated by RAS

Individual Bearer Channel Busy-out Initiated by Gateway Operator

Bearer T1/E1 Trunk Abrupt Shutdown Initiated by Gateway Operator

Bearer T1/E1 Trunk Abrupt Shutdown Initiated by RAS Operator

Bearer T1/E1 Trunk Graceful Shutdown Initiated by Gateway Operator

Bearer T1/E1 Trunk Graceful Shutdown Initiated by RAS Operator

RAS Loses IP Connectivity to SS7 Gateway

When the RAS loses IP connectivity, it tries to establish contact with the primary SS7 gateway; if that fails with the secondary gateway; if that fails with the primary gateway, etc. Once contact with a gateway is established, the RAS registers itself and the interfaces it supports.

What is claimed is:

1. A method comprising:
a) sending a status message from an access server to a gateway adapted to support signaling from a plurality of access servers, the access server being coupled to a data network and a telephone switch via a telecommunications medium to transmit user information between the telephone switch and the data network, the gateway being coupled to the access server and the telephone switch via an out-of-band communications medium to transmit signaling information between the telephone switch and the access server; and
b) acknowledging to the access server that the status message was received, the status message specifying capabilities of the access server.

2. The method of claim 1, wherein sending a status message from the access server to the gateway comprises sending a status message from the access server to the gateway that indicates the access server is operational.

3. The method of claim 1, wherein acknowledging to the access server that the status message was received comprises sending a status acknowledgement message from the gateway to the access server that indicates the status message was received.

4. The method of claim 3, wherein sending a status acknowledgement message from the gateway to the access server that indicates the status message was received comprises sending a status acknowledgement message from the gateway to the access server that indicates the status message was received and that the gateway allows the access server to receive calls.

5. The method of claim 4, wherein sending a status acknowledgement message from the gateway to the access server indicates the status message was received comprises sending a status acknowledgment message from the gateway to the access server that indicates the status message was received and that the gateway allows the access server to generate calls.

6. The method of claim 1, further comprising sending an interface status message from the access server to the gateway to register at least one interface on the access server that is available to receive user information from the telephone switch.

7. The method of claim 6, further comprising sending an interface status acknowledgement from the gateway to the access server in response to receiving the interface status message.

8. The method of claim 6, wherein sending the interface status message from the access server to the gateway to register at least one interface on the access server that is available to receive user information from the telephone switch comprises sending the interface status message from the access server to the gateway to register at least one interface on the access server that is available to receive user information from the telephone switch and to provide status on at least one channel on the interface.

9. The method of claim 8, further comprising sending a service message from the access server to the gateway upon a change of state in one of the interfaces and channels.

10. The method of claim 9, further comprising sending a service message from the gateway to the access server to request a change in the status of one or the at least one interfaces and channels on the access server.

11. A method comprising:
a) sending a continuity check message from a gateway to an access server, the access server being coupled to a data network and a telephone switch via a telecommunications medium to transmit user information between the telephone switch and the data network, the gateway being scalable to support signaling from a plurality of access servers including the access server, the gateway being coupled to the access server and the telephone switch via an out-of-band communications medium to transmit signaling information between the telephone switch and the access server; and
b) sending a continuity check result message from the access server to the gateway, the continuity check result message to report a result of a continuity check for a channel supported by the access server.

12. The method of claim 11, further comprising sending a continuity check result acknowledgment message from the gateway to the access server in response to sending a continuity check result message from the access server to the gateway.

13. An apparatus comprising:
a telephone switch;
a data network;
a plurality of access servers coupled to the data network via a telecommunications medium to transmit user information between the telephone switch and the data network, at least one of the plurality of access servers to send a status message that comprises information to indicate whether the access server is operational and information to specify capabilities of the access server;
a gateway coupled to the plurality of access servers and the telephone switch via an out-of-band communications medium, the gateway to transmit signaling information between the telephone switch and the plurality of access servers and to acknowledge receipt of the status message.

14. The apparatus of claim 13, wherein the means for sending the status message further comprising means for sending an interface status message from the access server to the gateway, the interface status message including information for the gateway to register at least one interface on the access server that is available to receive user information from the telephone switch.

15. The apparatus of claim 14, wherein the means for sending the interface status message further includes information providing status on at least one channel on the at least one interface.

16. The apparatus of claim 14, wherein the means for sending the status message further comprising means for sending a service message from the access server to the gateway upon a change of state in the at least one interface.

17. A method comprising:
a) receiving status messages from a first access server of a plurality of access servers interconnected to a gateway, each of the plurality of access servers being coupled to a data network and a telephone switch via a telecommunications medium to transmit user information between the telephone switch and the data network, the gateway being coupled to the plurality of access servers and the telephone switch via an out-of-band communications medium to transmit signaling information between the telephone switch and the plurality of access servers; and
b) acknowledging receipt of the status message to the first access server.

* * * * *